US010659529B2

(12) United States Patent
Chakra et al.

(10) Patent No.: US 10,659,529 B2
(45) Date of Patent: *May 19, 2020

(54) SOCIAL NETWORK IMAGE FILTERING

(71) Applicant: INTERNATIONAL BUSINESS MACHINES CORPORATION, Armonk, NY (US)

(72) Inventors: Al Chakra, Apex, NY (US); Jonathan Dunne, Dungarvan (IE); Liam Harpur, Dublin (IE); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,610

(22) Filed: Mar. 6, 2019

(65) Prior Publication Data
US 2019/0208010 A1 Jul. 4, 2019

Related U.S. Application Data

(63) Continuation of application No. 15/229,445, filed on Aug. 5, 2016, now Pat. No. 10,305,977.

(51) Int. Cl.
*H04L 12/58* (2006.01)
*H04L 29/08* (2006.01)
*H04L 29/06* (2006.01)
*G06Q 50/00* (2012.01)

(52) U.S. Cl.
CPC ......... *H04L 67/1085* (2013.01); *G06Q 50/01* (2013.01); *H04L 51/063* (2013.01); *H04L 51/10* (2013.01); *H04L 51/32* (2013.01); *H04L 63/04* (2013.01); *H04L 63/102* (2013.01)

(58) Field of Classification Search
CPC ... H04L 51/32; H04L 63/102; H04L 67/1085; H04L 51/063; H04L 63/04; H04L 51/10; G06Q 50/01
USPC .......................................................... 726/1
See application file for complete search history.

(56) References Cited

U.S. PATENT DOCUMENTS 9,195,678 B2 11/2015 Morrison et al.
2011/0202968 A1 8/2011 Nurmi
2012/0250950 A1* 10/2012 Papakipos .......... G06K 9/00677
382/118

(Continued)

OTHER PUBLICATIONS

List of IBM Patents or Patent Applications Treated as Related; Date Filed: Mar. 27, 2019. 2 pages.

*Primary Examiner* — Brandon S Hoffman
*Assistant Examiner* — Nega Woldemariam
(74) *Attorney, Agent, or Firm* — Cantor Colburn LLP; Teddi Maranzano

(57) ABSTRACT

Technical solutions are described automatically filtering user images being uploaded to a social network. An example computer-implemented method includes detecting an image file, which contains an image of a user, being uploaded to the social network server. The method further includes determining compliance of the image file with a predetermined profile associated with the user. The method further includes, in response to the image failing to comply with the predetermined profile, modifying the image file to generate a modified image file, and uploading the modified image file to the social network server.

20 Claims, 10 Drawing Sheets

(56) References Cited

U.S. PATENT DOCUMENTS

| | | |
|---|---|---|
| 2014/0129627 A1 | 5/2014 | Baldwin et al. |
| 2015/0213001 A1* | 7/2015 | Levy .................... G11B 27/031 715/202 |
| 2017/0041328 A1 | 2/2017 | Stack et al. |
| 2018/0041545 A1 | 2/2018 | Chakra |

* cited by examiner

SOCIAL NETWORK IMAGE FILTERING

DOMESTIC PRIORITY

This application is a continuation of U.S. patent application Ser. No. 15/229,445, filed Aug. 5, 2016, the disclosure of which is incorporated by reference herein in its entirety.

BACKGROUND

The present application relates to computer technology, and more specifically, to social network servers.

Usage of social networks, such as FACEBOOK™, GOOGLE+™, has increased in popularity. In addition, use of image capture apparatus, such as cameras, is increasingly prevalent. Further, image capture apparatus facilitate uploading captured image files to a social network, such as cameras coupled with smartphones, and other image capture apparatus that facilitate network connectivity. A user, for example, may capture an image, such as a photograph share the image via the social network, for example amongst the user's social cohorts, substantially instantaneously. However, such almost instantaneous process from capturing a moment to social publishing leads to unsolicited image publishing. It has been reported that a majority of social media users do not like when photos of themselves are posted without their approval (https://nakedsecurity.sophos.com/2012/02/16/facebook-users-hate-photos/). A study in 2012 noted that among 800 social network users that were polled, 90% of respondents felt that people should ask before posting pictures of the respondents online.

SUMMARY

According to one or more embodiments, a computer-implemented method for automatically filtering user images being uploaded to a social network server of a social network includes detecting an image file, which contains an image of a user, being uploaded to the social network server. The method further includes determining compliance of the image file with a predetermined profile associated with the user. The method further includes, in response to the image failing to comply with the predetermined profile, modifying the image file to generate a modified image file, and uploading the modified image file to the social network server.

According to one or more embodiments, a system for automatically filtering user images being uploaded to a social network includes a data repository including a predetermined profile associated with the user and a processing unit that has access to the data repository. The processing unit detects an image file associated with the user, being uploaded to the social network. The processing unit also determines compliance of the image file with the predetermined profile. In response to the image failing to comply with the predetermined profile, the processing unit modifies the image file to generate a modified image file, and uploads the modified image file to the social network.

According to one or more embodiments, a computer program product for automatically filtering user images being uploaded to a social network includes a computer readable storage medium including computer executable instructions to detect an image file associated with the user being uploaded to the social network. The computer program product also includes instructions to determine compliance of the image file with a predetermined profile. The computer program product also includes instructions to, in response to the image failing to comply with the predetermined profile, modify the image file to generate a modified image file, and upload the modified image file to the social network.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for automatically filtering image files being uploaded to a social network based on a location, a source-device, and a time associated with capture of the image files. As such, the technical solutions are rooted in and/or tied to computer technology in order to overcome a problem specifically arising in the realm of computers, specifically social networks.

For example, social network applications facilitate a user to be notified when an image of the user appears on the social network website through an upload from a third party. The social network application may provide a remediation (for example, remove a tag, ask the initial poster to remove the image or block the poster). Such forms of remediation do not stop the image from appearing outside of the user's profile page.

The technical solutions described herein facilitate the user to prevent the image from being posted on the social network. For example, the technical solutions facilitate the user to create an automatic photo profile filter (APPF), which describes specific attributes of images associated with the user that the social network may be posted. For example, the APPF limits what devices, what types of images, and from which posters the social network may post images without explicit consent from the user.

In one or more examples, as image files are uploaded to the social network, the technical solutions, by using image tagging and/or facial recognition, matches the image files with the APPF. The APPF contains a set of rules based on the attributes of the image files. The APPF further contains remedial actions corresponding to the respective rules in the APPF. For example, the remedial actions may include complete obfuscation of contents of the image, filtering the image of the user from the contents, blocking the uploading of the image file, and the like. Accordingly, depending on the set of rules and the remedial actions within the APPF, the technical solutions facilitate the user to control and/or filter the image files being uploaded to the social network, particularly the image files that contain contents associated with the user.

Figure 1:
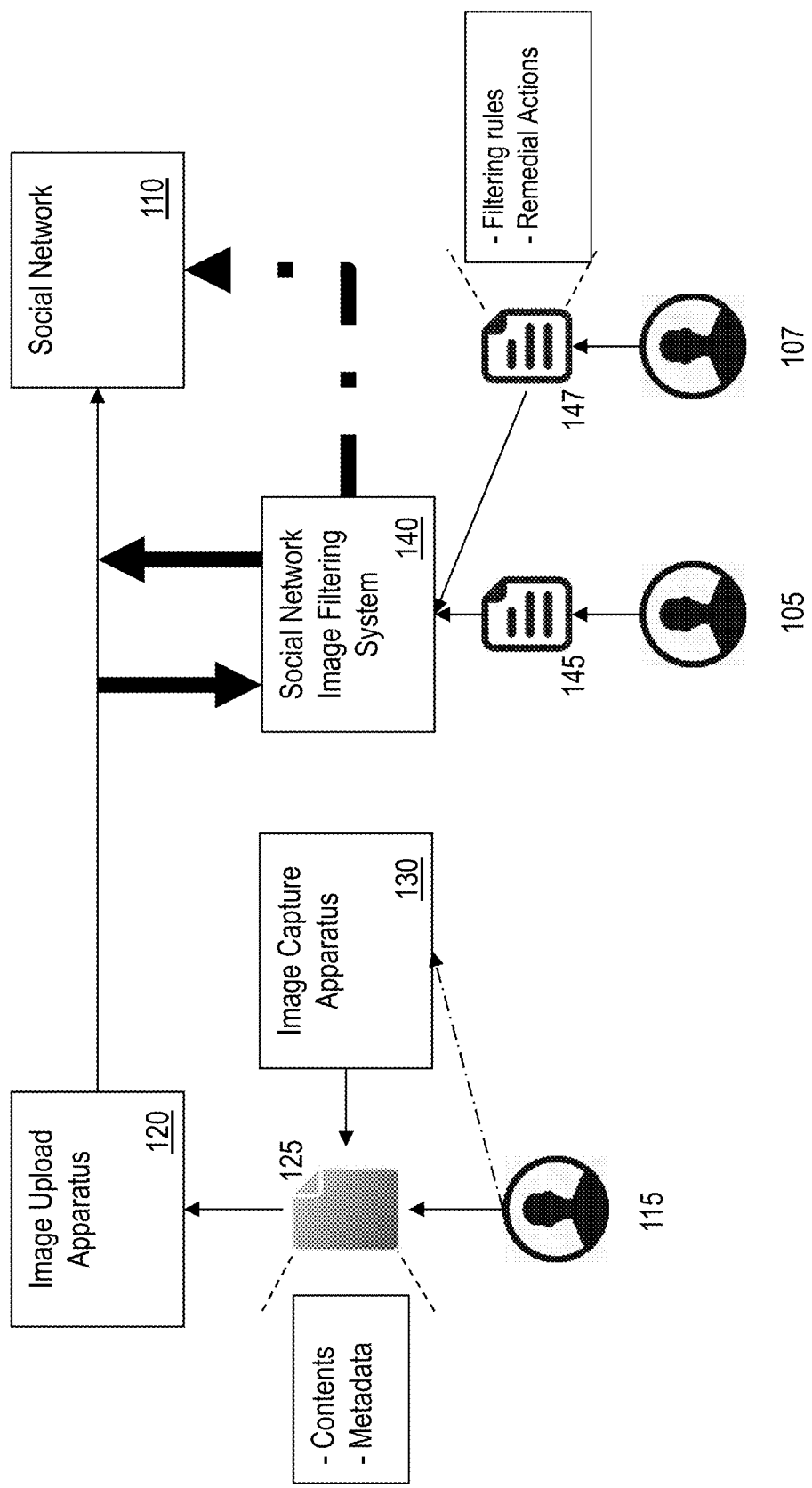
FIG. 1 illustrates an example scenario for filtering image files being uploaded to a social network in accordance with one or more embodiments.

FIG. 1 illustrates an example scenario for filtering image files being uploaded to a social network. For example, a user 105 desires to limit images of the user 105 being uploaded to, and thus posted on a social network 110. The user 105 may be a person, an organization (such as a business, an education institution, a charitable organization, and a non-profit organization) or any other entity. Further, an image of the user 105 may be a photo of the user himself/herself. Alternatively or in addition, the image of the user 105 may be a photo of a trademark, a service-mark, a logo, a brand name, or the like, associated with the user 105. Alternatively or in addition, the image of the user 105 may be a photo of a building or any other landmark that is typically associated with the organization, if the user 105 is an organization. In one or more examples, the user 105 may desire to limit image files being uploaded (and or posted) by a third-party 115. The third-party 115 may be another user, distinct from the user 105. The user 105 and the third-party 115 may be associated with one or more user-identifiers on the social network 110. For example, if the user 105 is a person, the social network 110 may associate a corresponding single user-identifier with the user 105. Alternatively, if the user 105 is an organization, the social network 110 may associate multiple user-identifiers with one or more spokespersons of the organization respectively.

The social network 110 may be a social networking platform such as FACEBOOK™, TWITTER™, SNAPCHAT™, INSTAGRAM™, GOOGLE+™, YELP™, or any other social network and/or messaging platform that facilitates a user of the social network 110 to post image files. The social network 110 includes one or more server computers that contain the electronic data for the social network 110. In one or more examples, the social network 110 may include a profile associated with each user. For example, the user 105 may have a corresponding profile on the social network 110. The profile provides a description of the user 105, such as likes, dislikes, hobbies, friends, acquaintances, relatives, employees, employers, colleagues, and other such attributes of the user 105. The user 105 may add and/or modify the profile by adding/modifying text and or media posted on the profile. The media may include image files, audio files, video files, and other such electronic media. Alternatively or in addition, the social network 110 may include text and image files associated with the user 105 that the third-party posts (or uploads).

The third-party 115 uploads an image file 125 to the social network 110 using an image upload apparatus 120. The data contained by the image file 125 includes contents and metadata. The contents include the pictorial contents that are displayed when the image file 125 is rendered by an apparatus, such as a computer, a phone, or the like. The metadata includes data associated with the contents, such as a time of capture, a location of capture, an identifier of an image capture apparatus 130, a size, a resolution, a time of modification, a location of modification, an identifier of an image modifying device, a tag corresponding to each user pictured in the contents, and the like. In one or more examples, the third-party 115 tags the image file 125 using an identifier associated with the user 105. The tag indicates that the image file 125 is associated with the user 105. For example, the contents of the image file 125 may include an image of the user 105.

In one or more examples, the third-party 115 may capture the image file 125 using the image capture apparatus 130 prior to uploading the image file 125 to the social network 110. Further, in one or more examples, the image capture apparatus 130 may be part of or the same as the image upload apparatus 120. For example, the image capture apparatus 130 and the image upload apparatus 120 may both be components of a smartphone, a tablet computer, and so on. Alternatively or in addition, the image capture device 130 that captures the contents of the image file 125 may be separate from the image upload apparatus 120. For example, a second user captures the image file 125 using the image capture apparatus 130, such as a phone, a camera, or the like, and sends the image file 125 to the third-party 115. The third-party 115 receives the image file 125 from the second user via the image upload apparatus 120, which may be a tablet computer. The third-party 115 further uploads the image file 125 using the image upload apparatus 120. Alternatively or in addition, the second user may be the third-party 115 using a separate image capture apparatus 130 to capture the image file 125, and uploading the image file 125 using the image upload apparatus 120.

The third-party 115 uploading the image file 125 to the social network 110 may be intercepted by a social network image filtering system 140. The social network image filtering system 140 automatically filters the image file 125 being uploaded to the social network 110 based on attributes of the image file 125 and an automatic photo profile filter (APPF) 145 corresponding to the user 105. The user 105 configures the APPF 145. For example, the APPF 145 filters the image file 125 based on a location, a source-device, and a time associated with capture and/or upload of the image file 125. For example, the APPF 145 contains a set of rules that identify whether the image file 125 is to be posted on the social network 110. The APPF 145 further contains a set of remedial actions that the social network image filtering system 140 may take in response to the image file 125 not being compliant with one or more of the rules in the APPF 145. For example, the social network image filtering system 140 may generate a modified image file based on the image file 125 and upload the modified image. Alternatively, the social network image filtering system 140 may block the uploading of the image file 125. Alternatively or in addition, the social network image filtering system 140 may alert the user 105 of the image file 125 and facilitate the user 105 to explicitly authorize (or not) the uploading of the image file 125.

In one or more examples, the social network image filtering system 140 may facilitate multiple users to filter the image files being uploaded to the social network 110. For example, another user 107 may configure a corresponding APPF 147, which includes filtering rules and remedial actions as configured by the other user 107. In one or more examples, the social network image filtering system 140 filters the image file 125 using multiple APPFs from respective users.

Further, in one or more examples, the social network image filtering system 140 filters image files that have already been posted on the social network 110. For example, the user 105 may trigger the social network image filtering system 140 to identify image files that are posted on the social network, such as within a specific time frame, or any time in the past, that are not compliant per the APPF 145 and takes remedial actions as specified per the APPF 145.

In one or more examples, the social network image filtering system 140 may be implemented using cloud computing. It is understood in advance that although a detailed description on cloud computing is provided herein, implementation of the technical solutions recited herein are not limited to a cloud computing environment. Rather, embodiments of the technical solutions are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
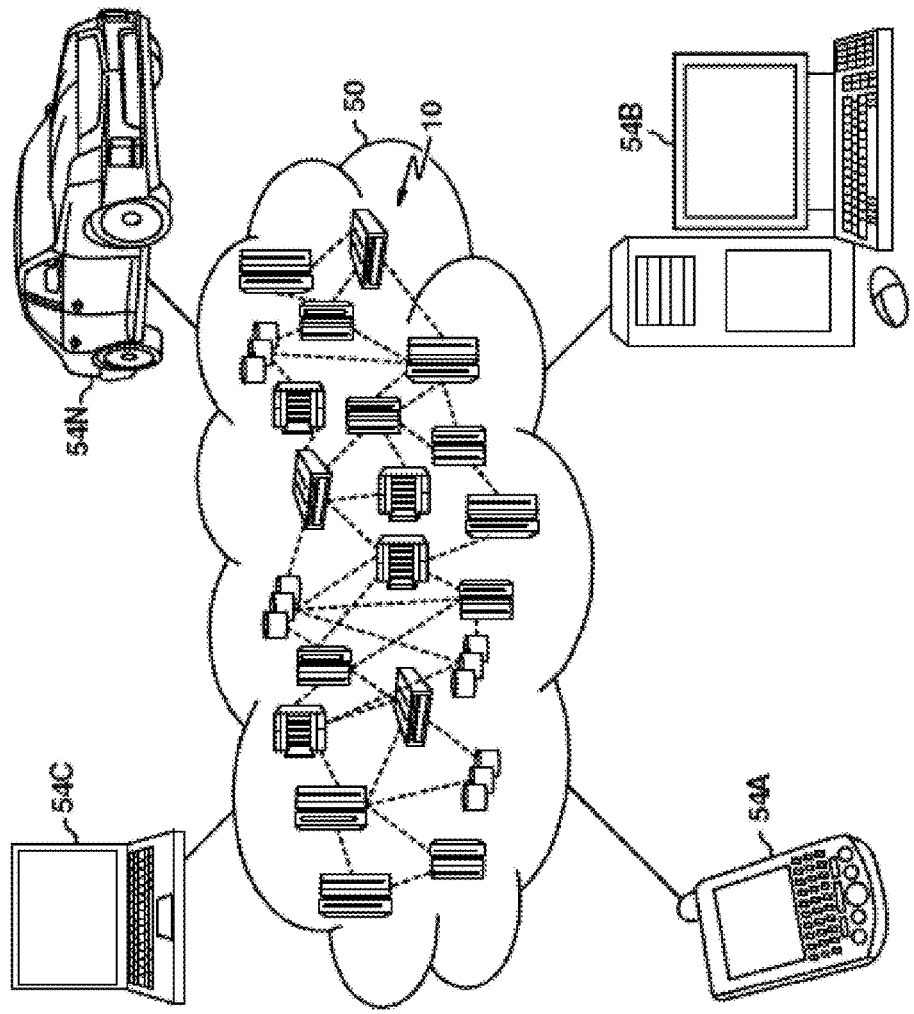
FIG. 2 illustrates an example cloud computing environment in accordance with one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
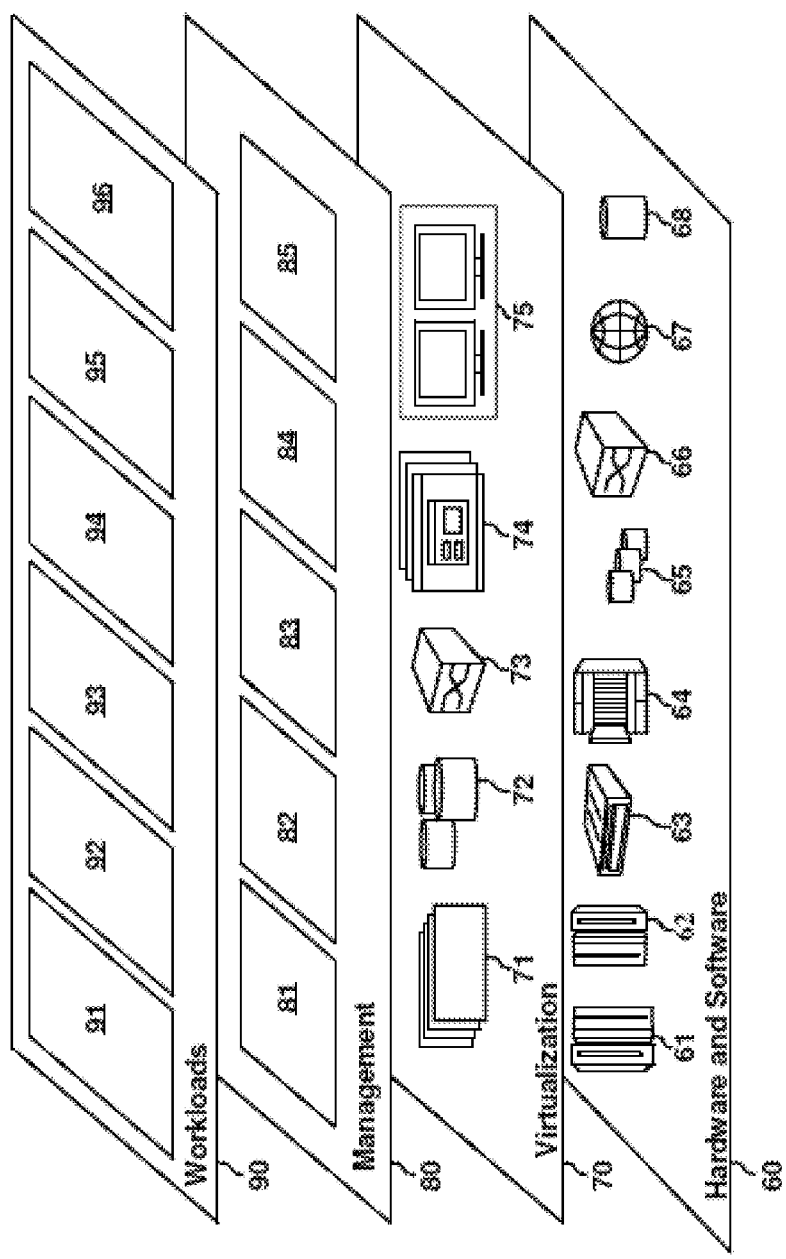
FIG. 3 illustrates an example set of functional abstraction layers provided by cloud computing environment in accordance with one or more embodiments.

Referring now to FIG. 3, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: social network image filtering 91; face recognition 92; shape recognition 93; data analytics processing 94; transaction processing 95; and creating and configuring APPFs of 96.

Figure 4:
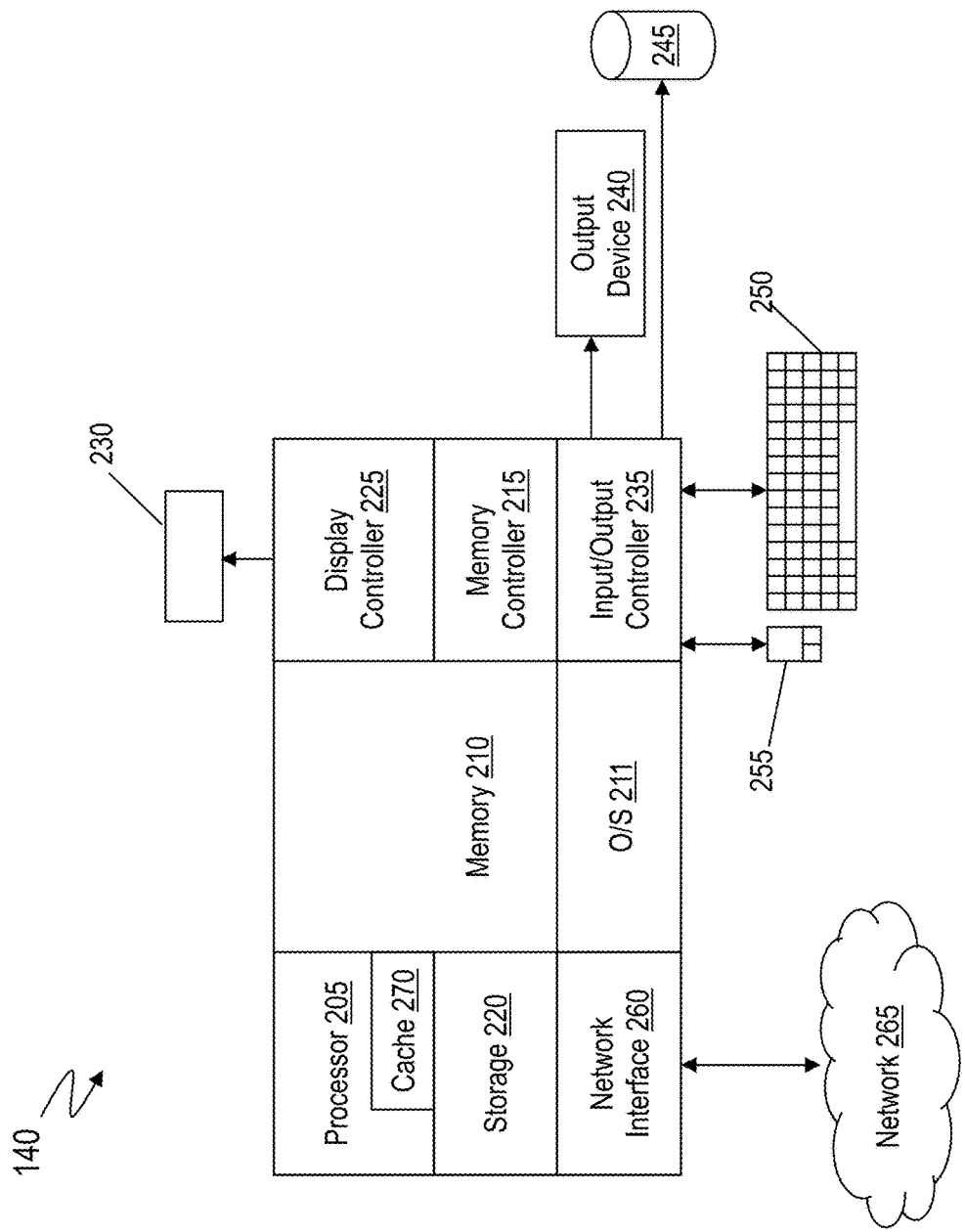
FIG. 4 illustrates example components of a social network image filtering system in accordance with one or more embodiments.

FIG. 4 illustrates example components of the social network image filtering system 140. The social network image filtering system 140 may be a communication apparatus, such as a computer. For example, the social network image filtering system 140 may be a desktop computer, a tablet computer, a laptop computer, a phone, such as a smartphone, a server computer, or any other device that communicates via a network 265. The social network image filtering system 140 includes hardware, such as electronic circuitry.

The social network image filtering system 140 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the social network image filtering system 140, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 4, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The social network image filtering system 140 may further include a display controller 225 coupled to a user interface or display 230. In some embodiments, the display 230 may be an LCD screen. In other embodiments, the display 230 may include a plurality of LED status lights. In some embodiments, the social network image filtering system 140 may further include a network interface 260 for coupling to a network 265. The network 265 may be an IP-based network for communication between the social network image filtering system 140 and an external server, client and the like via a broadband connection. In an embodiment, the network 265 may be a satellite network. The network 265 transmits and receives data between the social network image filtering system 140 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
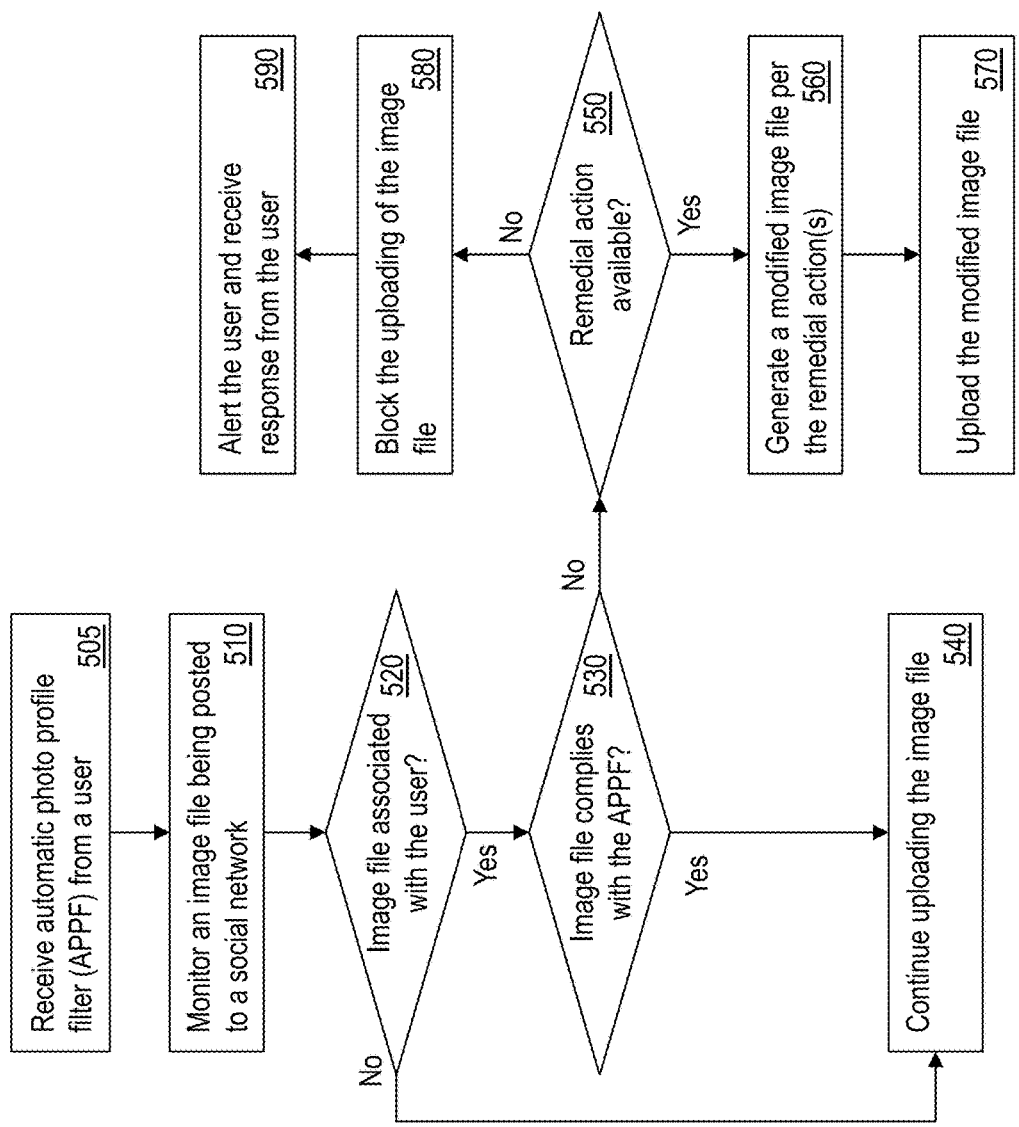
FIG. 5 illustrates a flowchart of an example method for automatically filtering the image files being uploaded to a social network in accordance with one or more embodiments.

FIG. 5 illustrates a flowchart of an example method for automatically filtering the image files being uploaded to the social network 110. The social network image filtering system 140 receives the APPF 145 from the user 105, as shown at block 505. In one or more examples, the social network image filtering system 140 provides a user-interface for the user 105 to create and configure the APPF 145. For example, the user 105 accesses the user-interface via a website of the social network image filtering system 140. The user 105 creates, adds, or modifies the set of rules and the corresponding remedial actions in the APPF. In one or more examples, the social network image filtering system 140 receives multiple APPFs from respective users.

The social network image filtering system 140 detects the image file 125 being posted to the social network 110, as shown at block 510. In one or more examples, the social network image filtering system 140 monitors the social network 110 to detect the posting. Alternatively or in addition, the social network 110 notifies the social network image filtering system 140 in response to receiving the image file 125. In one or more examples, the social network 110 stores the image file 125 in a temporary location until the social network image filtering system 140 analyzes the image file 125. In one or more examples, the social network image filtering system 140 is part of the social network 110.

Figure 6:
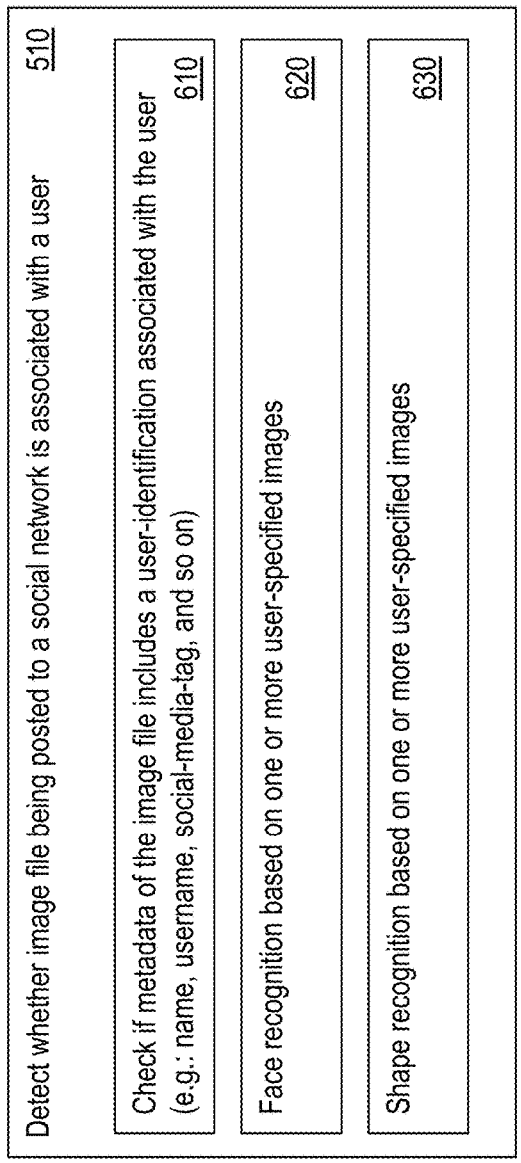
FIG. 6 illustrates a flowchart of an example method for detecting that an image file is associated with the user in accordance with one or more embodiments.

The social network image filtering system 140 further determines if the image file 125 is associated with the user 105, as shown at block 520. FIG. 6 illustrates a flowchart of an example method for detecting that the image file 125 is associated with the user 105. The social network image filtering system 140 determines that the image file 125 is associated with the user 105 based on the metadata and/or the contents of the image file 125. For example, the social network image filtering system 140 determines that the image file 125 is associated with the user 105 based on the tags in the metadata, as shown at block 610. For example, the tags in the metadata may identify the people in the contents of the image file 125. Alternatively or in addition, the metadata may include usernames or references of the people (for example, TWITTER™ handle, FACEBOOK profile link) in the contents. Alternatively or in addition, the metadata may include social-media-tags (such as '#Olympics2016') that identify the user 105. The user 105 may specify the tags that trigger detection of the image file 125. Additional metadata elements may be used to analyze the image file 125.

Alternatively or in addition, the social network image filtering system 140 uses face recognition and/or shape recognition to determine whether the image file is associated with the user 105, as shown at blocks 620 and 630. For example, the user 105, via the APPF 145 specifies one or more images that include the face of the user 105, or the trademark or any other shape that the user 105 to use for the face/shape recognition. The social network image filtering system 140 may implement face/shape recognition based on the specified images to determine whether the image file 125 contains a depiction of the user 105 and/or the shapes specified by the user.

Referring back to FIG. 5, if the image file 125 is not associated with the user 105, the social network image filtering system 140 indicates the social network 110 to continue with the uploading of the image file 125, as shown at blocks 520 and 540. Alternatively, if the image file 125 is associated with the user 105, the social network image filtering system 140 determines whether the image file 125 complies with the set of rules specified in the APPF 145, as shown at block 530. If the image file 125 is compliant with the APPF 145, the social network image filtering system 140 indicates to the social network 110 to continue uploading the image file 125, as shown at block 540.

Figure 7:
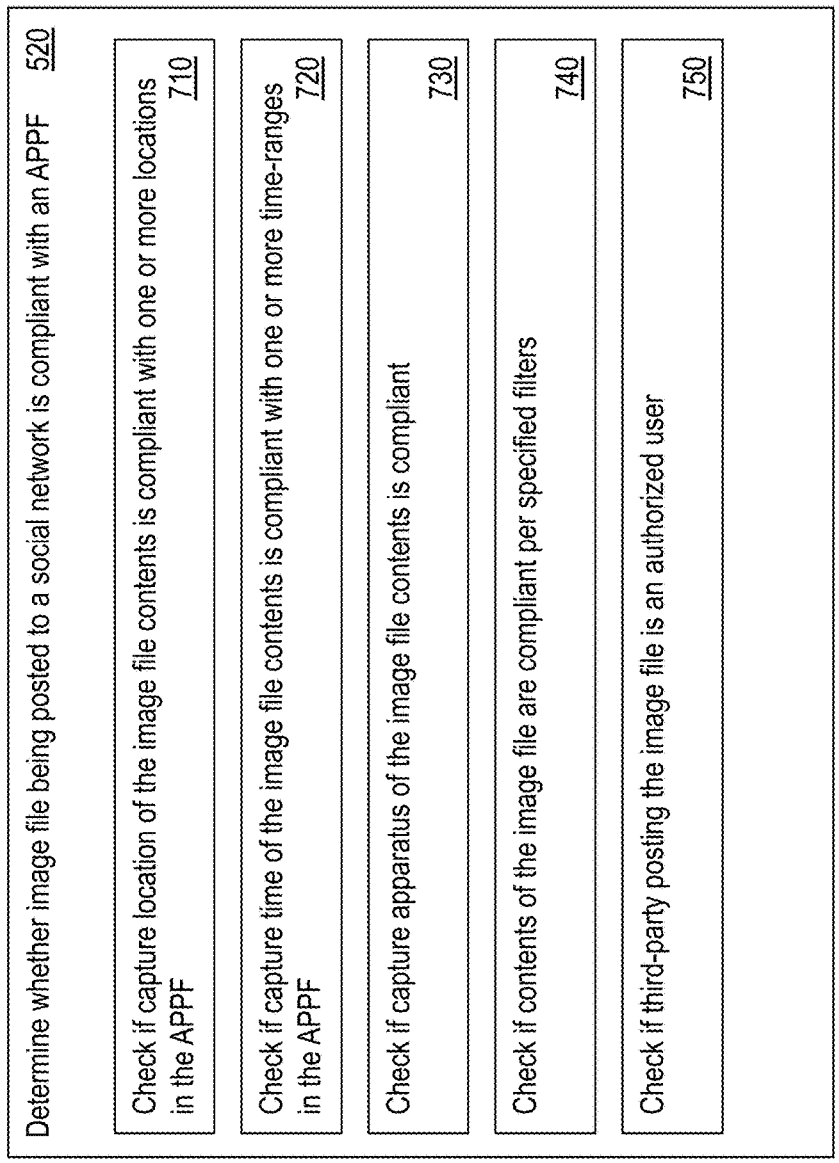
FIG. 7 illustrates an example flowchart for determining if an image file complies with an automatic photo profile filter in accordance with one or more embodiments.

FIG. 7 illustrates an example flowchart for determining if the image file 125 complies with the APPF 145. For example, the social network image filtering system 140 checks if the image file 125 is compliant based on the capture location of the contents of the image file 125, as shown at block 710. For example, the APPF 145 includes a list of geographic locations. The social network image filtering system 140 determines whether the contents of the image file 125 were captured at any of the geographic locations specified in the APPF 145. The social network image filtering system 140 deems the image file 125 as compliant (or non-compliant) if the contents were captured at any of the specified locations. The user 105 may specify the locations in the APPF 145 in the form of geographic coordinates, a name of a city, a name of a state, a name of a county, a name of a country, a name of a restaurant, a name of a bar, a name of a landmark, or in any other form. For example, the APPF 145 may specify that the image file 125 be filtered if the corresponding capture location is a specific bar.

Further, the social network image filtering system 140 checks if the image file 125 is compliant based on capture time of the image file contents, as shown at block 720. For example, the APPF 145 includes one or more time-ranges. The social network image filtering system 140 determines whether the contents of the image file 125 were captured in any of the time-ranges specified in the APPF 145. The social network image filtering system 140 deems the image file 125 as compliant (or non-compliant) if the contents were captured during any of the specified time-ranges. The user 105 may specify the time-ranges as a specific date and time, or a specific range of time of any day, or a specific range of time on particular days of the week, or in any other form. For example, the APPF 145 may specify that the image file 125 be filtered if the corresponding capture time is within 10:00 PM to 5:00 AM on a Friday.

The user 105 may use a combination of the capture time and the capture location. For example, the APPF 145 facilitates the user 105 to filter the image file 125 if the contents were captured at the specific bar and between 10:00 PM to 5:00 AM on a Friday.

Further, the social network image filtering system 140 checks if the image file 125 is compliant based on the image capture apparatus 130 used to capture the contents of the image file 125, as shown at block 730. For example, the APPF 145 includes one or more apparatus identifiers. For example, an apparatus identifier may be a user-identifier, where the user-identifier identifies a user to which the image capture apparatus 130 belongs. Alternatively or in addition, the apparatus identifiers may include a unique identifier associated with the image capture apparatus 130, such as a MAC address, a serial number, or the like. The metadata of the image file 125 includes a corresponding apparatus identifier that identifies the image capture apparatus 130 that was used to capture the contents. The social network image filtering system 140 determines whether the contents of the image file 125 were captured by (or not) any of the apparatus specified in the APPF 145. The social network image filtering system 140 deems the image file 125 as compliant (or non-compliant) if the contents were captured by any of the specified apparatus. The user 105 may specify the apparatus identifiers in the APPF 145. For example, the APPF 145 may specify that the image file 125 be filtered if the corresponding image capture apparatus is "John's phone."

The user 105 may use a combination of the capture time, the capture location, and the capture device. For example, the APPF 145 facilitates the user 105 to filter the image file 125 if the contents were captured at the specific bar, between 10:00 PM to 5:00 AM on a Friday, and by John's phone. It is understood that other combinations of the attributes may be used.

Further, the social network image filtering system 140 checks if the image file 125 is compliant based on the contents of the image file 125 including specific features, as shown at block 740. For example, the APPF 145 may include one or more specific image-filters to identify respective features in the contents. For example, the APPF 145 may include a stain filter that identifies if the contents depict the user 105 with a stain, such as a coffee. For example, the image-filter may include a pattern that the social network image filtering system 140 compares with the contents of the image file 125. The pattern may be a shape pattern or a color pattern. Alternatively or in addition, the APPF 145 may include an image-filter that identifies that the user 105 in the image is wearing particular clothing (such as swimwear), or has experienced a wardrobe malfunction, or the like. For example, the image-filter may detect a pattern in the contents based on shapes, colors, or the like.

The user 105 may use a combination of the capture time, the capture location, the capture device, and the image-filter. For example, the APPF 145 facilitates the user 105 to filter the image file 125 if the contents were captured at the specific bar, between 10:00 PM to 5:00 AM on a Friday, by John's phone, and if the user 105 had a stain on the clothes. It is understood that other combinations of the attributes may be used.

Further, the social network image filtering system 140 checks if the third-party 115 that is posting the image file 125 is an authorized user, as shown at block 750. Accordingly, the user 105 prevents an unauthorized third-party 115 from posting the image file 125 using an authorized image capture device at an authorized time from an authorized location. For example, the APPF 145 specifies one or more authorized users, for example in the form of a list of user identifiers, names, or any other identifying mark. The social network image filtering system 140 determines the user-identifier associated with the third party 115 that is uploading the image file 125. For example, the social network image filtering system 140 queries the social network 110 to identify the user identifier of the third-party 115. The social network image filtering system 140 compares the user identifier of the third party 115 with the specified user identifiers in the APPF 145 to determine if the third-party 115 is an authorized user. For example, the user 105 may specify a list of user-identifiers as the authorized users (or unauthorized users).

The user 105 may use a combination of the capture time, the capture location, the capture device, the image-filter, and the user identifier of the third-party. For example, the APPF 145 facilitates the user 105 to filter the image file 125 if the contents were captured at the specific bar, between 10:00 PM to 5:00 AM on a Friday, by John's phone, and is being uploaded by Peter. It is understood that the combination may include fewer, additional, or different combinations of the attributes. For example, another combination may further filter the image if the user 105 had a stain on the clothes. Table 1 illustrates a few examples.

TABLE 1

| Device name | From poster | Time | Location |
|---|---|---|---|
| John's Phone | Any | Any | Any |
| Peter's Phone | Peter | Allow Before 21:00 | Dublin |
| Paul's Phone | Paul and Mary | Allow Before 21:00 After 09:00 | Any excluding Las Vegas |

Figure 8:
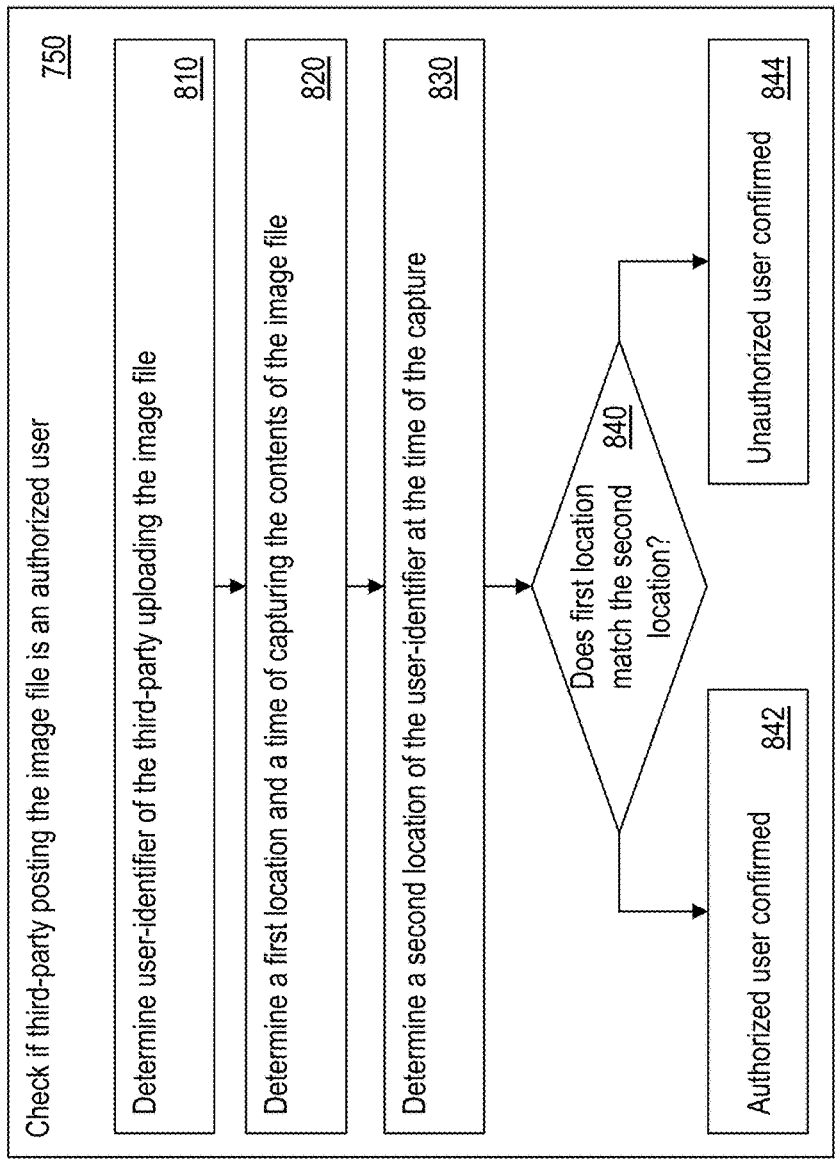
FIG. 8 illustrates a flowchart of an example method for verifying authenticity of a third-party that is uploading the image file in accordance with one or more embodiments.

Further, the social network image filtering system 140 confirms that the image file 125 is indeed being uploaded by the third-party 115 as indicated by the social network 110. Accordingly, the social network image filtering system 140 prevents an unauthorized user from using an existed logged in account to upload the image file 125. For example, FIG. 8 illustrates a flowchart of an example method for verifying authenticity of the third-party 115 uploading the image file 125. For example, the social network image filtering system 140 determines the user-identifier of the third-party 115, as shown at block 810. The social network image filtering system 140 further determines a first location and a time at which the contents of the image file 125 were captured, as shown at block 820. The social network image filtering system 140 further determines a second location associated with the user-identifier of the third-party 115, as shown at block 830. For example, the social network image filtering system 140 requests the social network 110 for the second location of the user-identifier. In one or more examples, the social network 110 captures and logs a location associated with the user-identifiers with accounts on the social network 110. Alternatively or in addition, the social network image filtering system 140 requests the second location of the user-identifier by requesting a device, such as a smartphone or the like of associated with the user-identifier. If the first location, at which the contents were captured, matches the second location associated with the user-identifier at the time the contents were captured, the social network image filtering system 140 confirms that the third-party 115 is indeed one of the authorized users from the APPF 145, as shown at block 840, as shown at block 842. Else, the social network image filtering system 140 deems that an unauthorized user is trying to upload the image file 125 using the authorized image capture device 130, as shown at block 844.

In one or more examples, the social network image filtering system 140 monitors the first location associated with the image capture device 130 and the second location associated with a user-identifier that is authorized to upload the image file 125 using the image capture device 130. For example, consider the example from Table 1 in which both Paul and Mary may upload an image file from Pail's phone at a specified time and from a specified location. The social network image filtering system 140 determines whether Mary (or Paul) over at least a predetermined period, is holding/managing the image capture device (Paul's phone), based on the first and second locations. For example, the social network image filtering system 140 monitors the relative location of Mary (or Paul) and the image capture device (Paul's phone) over the predetermined period to determine if a predetermined statistical threshold is reached. If so, the social network image filtering system 140 concludes that image file 125 is being uploaded by the authorized user Mary (or Paul) using the image capture device (Paul's phone). In such a case, the social network image filtering system 140 proceeds to publish/post the image file 125 depending on remaining configuration of the APPF 145.

Referring back to FIG. 5, if the social network image filtering system 140 determines that the image file complies with the set of rules in the APPF 145 as described herein, the social network image filtering system 140 continues the uploading of the image file 125, as shown at blocks 530 and 540. If the image file 125 is non-compliant, the social network image filtering system 140 determines if a remedial action is available in the APPF 145, as shown at block 550. The APPF 145 may not have a remedial action for each non-compliant condition. Alternatively or in addition, a remedial action may be to block (or abort) the uploading, as shown at block 580. In such cases, if the social network 110 has stored the image file 125 in a temporary cache, the social network 110 deletes the image file 125 from the cache. In one or more examples, the social network 110 may notify the third-party 115 that the upload was aborted based on the image file 125 being non-compliant according to the APPF 145 of the user 105. Accordingly, the third-party 115 may remedy the image file 125 and try uploading again. Alternatively or in addition, the social network image filtering system 140 may indicate to the user 105 that uploading the image file 125 was blocked, as shown at block 590. In one or more examples, the social network image filtering system 140 may display the image file for viewing by the user 105. The user 105 may (or may not) authorize uploading the image file 125. Accordingly, based on the response from the user 105, the social network image filtering system 140 may or may not continue the uploading.

Figure 9:
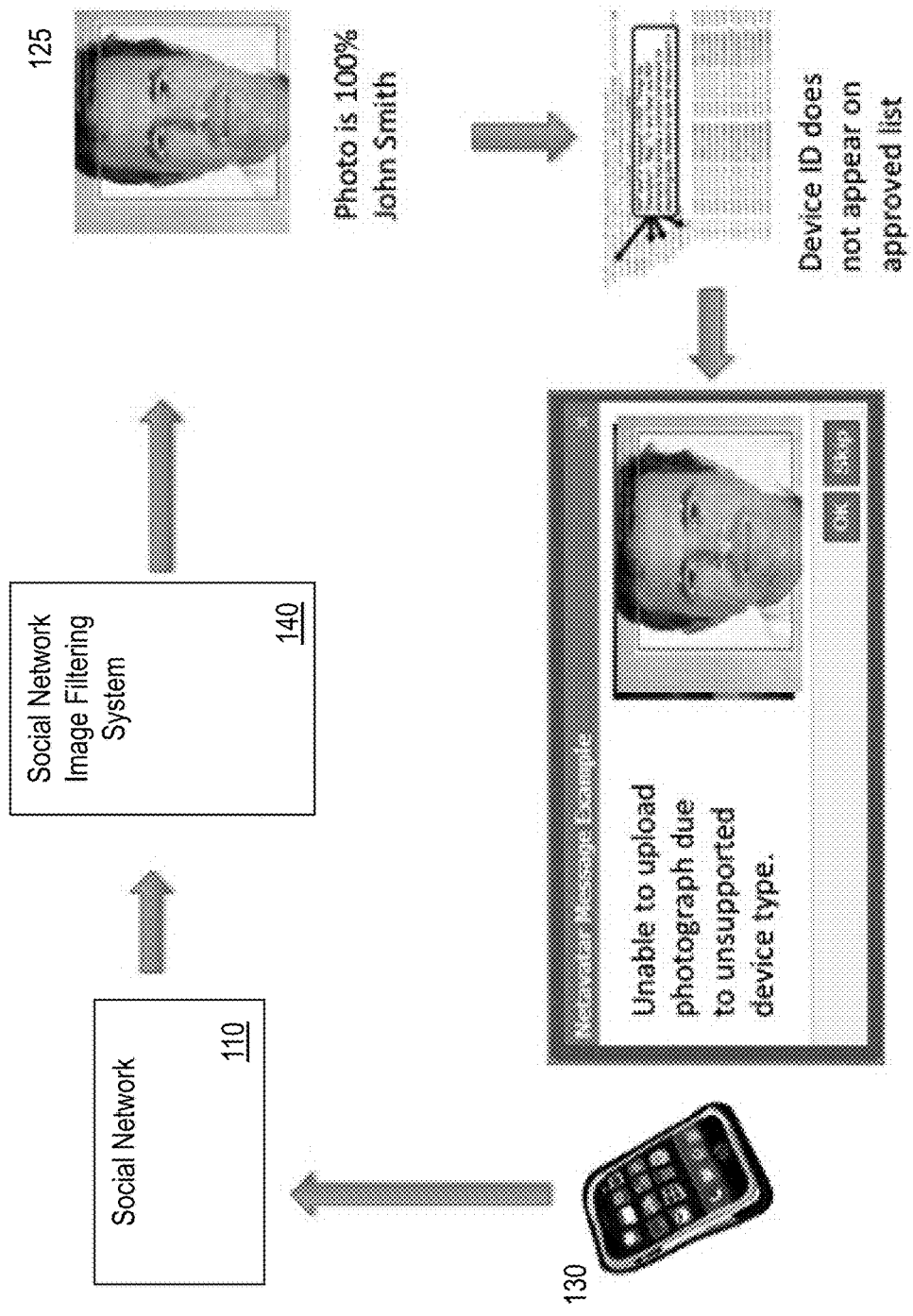
FIG. 9 illustrates an example scenario, where an upload of an image file is blocked in accordance with one or more embodiments.

FIG. 9 illustrates an example scenario, where the upload is blocked in response to a device identifier of the image capture apparatus 130 not being on the authorized list of image capture devices in the APPF 145. As described herein, the APPF 145 may specify different, additional or a combination parameters to block the uploading.

Figure 10:
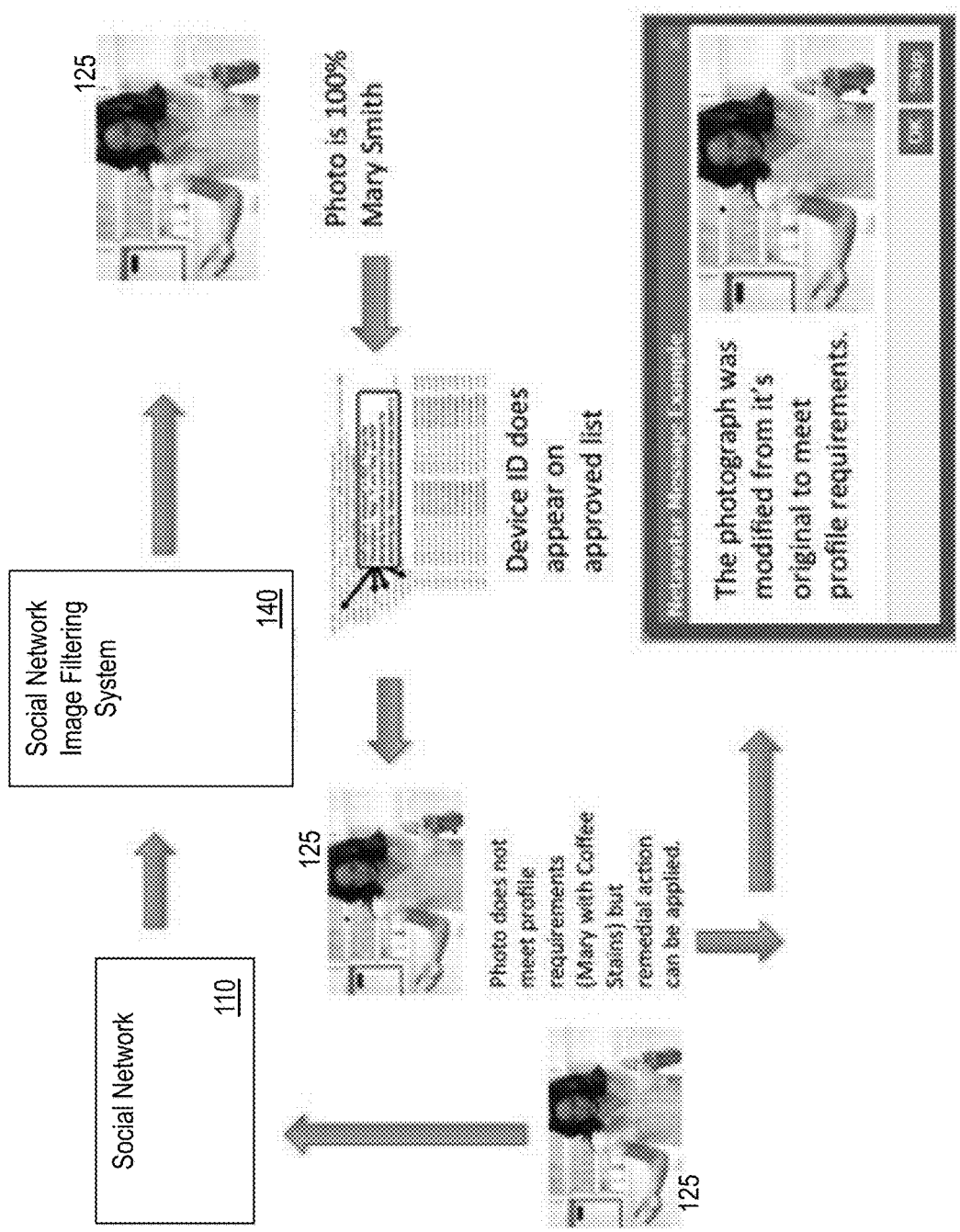
FIG. 10 illustrates an example dataflow of an example scenario, where a modified image is generated and uploaded to a social network in accordance with one or more embodiments.

Referring back to FIG. 5, if the APPF 145 does include a remedial action for the non-compliance of the image file 125, the social network image filtering system 140 applies the remedial action and generates a modified image file, as shown at block 560. The social network image filtering system 140 further uploads the modified image to the social network 110, as shown at block 570. In one or more examples, the social network image filtering system 140 after generating the modified image may repeat the determining compliance of the modified image with the APPF 145, as shown at block 530. FIG. 10 illustrates an example dataflow of an example scenario, where a modified image is generated and uploaded.

In one or more examples, the remedial action may depend on the relation of the third-party 115 and the user 105 in the social network 110. Table 2 illustrates example scenarios where the remedial action is based on a social graph difference between the user 105 (User A) and different third-party posters (UserX). The social graph difference may be determined based on the relation specified by the user 105. Alternatively, the social graph difference between the user 105 and the third party 115 may be determined based on a number of common attributes between the user 105 and the third party 115. A social graph is a data structure that indicates the multiple ways different people are connected with each other. In the social graph, each user, for example, is a vertex and each relationship connecting two people is an edge. There can be multiple edges connecting people (e.g. A and B work at the same company, A and B are connected via an instant messenger, A and B live in the same state, and so on). Each edge in the social graph may have a label, which describes the relationship it represents. Each edge, based on the type of the relationship may be assigned a predetermined score. A difference between the social graphs of two users provides a social graph difference that may be indicative of a priority of a relationship between the two users. For example, a smaller social graph difference may indicate a higher priority relationship.

For example, the social network 110 may categorize the relation types between the user 105 and the third-party 115, and the social network image filtering system 140 varies the remedial action based on the type of the relation. For example, as illustrated in Table 2, if the relation is that of a 'friend', which is the highest priority of relation, the social network image filtering system 140 may use a first remedial action filter of type '4' for the image file 125. For example, the first remedial action filter removes red-eyes, balances color, and performs other cosmetic changes or a combination thereof. Alternatively or in addition, if the relation is that of an 'acquaintance', which has a lower priority than the 'friend' relation does, the social network image filtering system 140 may implement a different remedial action, such as removing specific patterns, such as stains, wardrobe malfunctions, and the like. Further, if the relation is 'indirect acquaintance' or any other further lower priority (or non-existing relation), the social network image filtering system 140 may block uploading the image file 125, and/or alert the user 105.

TABLE 2

| User | UserX->UserA Social Graph difference | Filter Level Based on Social Graph | GPS co-ordinates correlation to DeviceX and User and Target |
|---|---|---|---|
| UserB | 345, 4545a, 2344 (friend) | 4 (cosmetic) | 44% |
| UserC | 8672, 3452v, 3454 (acquaintance) | 5 (stains, wardrobe) | 23% |
| userD | 4522, 654b, 876 (indirect) | 6 (block, alert) | 12% |

Alternatively or in addition, the social network image filtering system 140 may further select the remedial action filter to use based on the geographic locations, capture times, and other attributes as described herein.

It is understood that the image file 125 in the examples described herein may be an electronic data file that includes a still image, a motion picture (video), or any other visual media. Further, it is understood that the image file 125 may be of any type or format, such as JPEG, BMP, PNG, SVG, MPEG, and so on.

The user 105 may specify one or more APPFs corresponding to one or more social networks respectively. Alternatively or in addition, the APPF 145 may include separate sets of rules and remedial actions corresponding to each respective social network. Alternatively or in addition, a compliance criterion in the APPF 145 may specify for which social network(s) the criterion is applicable. Accordingly, in one or more examples, the social network image filtering system 140 analyzes the image file 125 for the specific social network 110. Further, the social network image filtering system 140 analyzes the image file 125 for APPFs of multiple users, such as the user 105 and the user 107. In one or more examples, the APPFs may be stored in a data repository that the social network image filtering system 140 accesses.

Accordingly, the technical solutions described herein facilitate a user to create an automatic photo profile filter (APPF), which describes what device types, and from whom can images or any other media be posted to a social network. The technical solutions further facilitate the user to filter the image files being uploaded to the social network based on location, time, and the like or combinations of thereof. In one or more examples, as image files are uploaded to social network websites, by using image tagging and/or facial/shape recognition images are matched with the APPF. Based on the APPF information filtering is employed to either obfuscate the user from the image or apply any other remedial actions. The remedial actions may be based on a social graph centrality for the user, where a dynamic level of photo filtering can be relative to the relationship between the poster and user in the image file. Remedial actions may include removing the user, filtering the user using a post-production filter, and/or overlaying the user with a predetermined image overlay, and so on.

Thus, the social network image filtering described herein facilitates the user to perform automatic pre-emptive image filtering of an image file being uploaded based on a predefined criteria, wherein the filtering is graduated based on the relationship between the poster and the user. Further, remedial actions are taken to remedy any non-compliance, where the remedial action is based on the relationship between the poster and the user.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for automatically filtering user images being uploaded to a social network server of a social network, the method comprising:
   receiving, by a processor, a predetermined profile associated with a user, the predetermined profile specifying one or more filters for restricting image files containing the user from being uploaded to the social network server;
   detecting, by the processor, in an image file that is sent for being uploaded to the social network server, an image of the user;
   responsively determining, by the processor, compliance of the image file with the predetermined profile that is associated with the user, wherein determining compliance comprises:
      identifying a time at which the image file was captured; and
      determining that the time at which the image file was captured is within a specified range listed in the predetermined profile; and
   in response to the image file failing to comply with the predetermined profile, filtering the image file from being uploaded to the social network server.

2. The computer-implemented method of claim 1, wherein the predetermined profile comprises a set of predetermined image features comprising a source device identifier, a geographic location, and user-identifier.

3. The computer-implemented method of claim 1, further comprising, modifying the image file in response to the image file failing to comply with a first image feature from the predetermined profile, and in response to the image failing to comply with a second image feature from the predetermined profile, blocking the uploading of the image file to the social network server.

4. The computer-implemented method of claim 1, wherein the detecting the image file comprises identifying a tag associated with the image file being associated with the user.

5. The computer-implemented method of claim 1, wherein the detecting the image file comprises identifying a face of the user being in contents of the image file.

6. The computer-implemented method of claim 1, wherein the detecting the image file comprises identifying a predetermined shape in contents of the image file.

7. The computer-implemented method of claim 1, wherein determining compliance of the image file with the predetermined profile comprises:
- identifying a source device that captured contents of the image file; and
- determining that the source device is one of a predetermined set of source devices listed in the predetermined profile.

8. The computer-implemented method of claim 1, wherein determining compliance of the image file with the predetermined profile comprises:
- identifying a geographic location at which contents of the image file were captured; and
- determining that the geographic location is one of a predetermined set of locations listed in the predetermined profile.

9. The computer-implemented method of claim 1, wherein, in response to the image file failing to comply with the predetermined profile, the method further comprises:
- modifying the image file to generate a modified image file; and
- uploading the modified image file to the social network server in place of the image file that was sent.

10. The computer-implemented method of claim 1, wherein determining compliance of the image file with the predetermined profile comprises:
- determining that the image file was captured by an authorized user, wherein the determining comprises:
  - identifying a source device that captured contents of the image file;
  - determining a user-identifier associated with the source device;
  - determining a location and time at which the contents of the image file were captured; and
  - determining that the user-identifier is from a list of authorized users from the predetermined profile and that the authorized user associated with the user-identifier was at the location at the time.

11. The computer-implemented method of claim 1, wherein the user is a first user, and wherein determining compliance of the image file with the predetermined profile that is associated with the first user further comprises identifying that the image captured in the specified range is being uploaded by a particular second user specified in the predetermined profile.

12. The computer-implemented method of claim 1, wherein the user is a first user, and wherein determining compliance of the image file with the predetermined profile that is associated with the first user further comprises:
- identifying that the image captured in the specified range is being uploaded by a particular second user specified in the predetermined profile, the image captured at a first location;
- determining a second location associated with the second user at the time at which the image file was captured; and
- comparing the second location and the first location, wherein a substantial match results in the image file being compliant with the predetermined profile.

13. A system for automatically filtering user images being uploaded to a social network server, the system comprising:
- a data repository comprising a predetermined profile associated with the user;
- a processing unit that has access to the data repository, the processing unit configured to:
  - receive a predetermined profile associated with a user, the predetermined profile specifying one or more filters for restricting image files containing the user from being uploaded to the social network server;
  - detect in an image file that is sent for being uploaded to the social network server, an image of the user;
  - responsively determine compliance of the image file with the predetermined profile that is associated with the user, wherein determining compliance comprises:
    - identifying a time at which the image file was captured; and
    - determining that the time at which the image file was captured is within a specified range listed in the predetermined profile; and
  - in response to the image file failing to comply with the predetermined profile, filter the image file from being uploaded to the social network server.

14. The system of claim 13, wherein the processing unit detects the image file being associated with the user based on a tag associated with the image file being associated with the user.

15. The system of claim 13, wherein the processing unit determines compliance of the image file with the predetermined profile by:
- identifying a source device that captured contents of the image file; and
- determining that the source device is one of a predetermined set of source devices listed in the predetermined profile.

16. The system of claim 13, wherein the processing unit determines compliance of the image file with the predetermined profile by:
- identifying a geographic location at which contents of the image file were captured; and
- determining that the geographic location is one of a predetermined set of locations listed in the predetermined profile.

17. The system of claim 13, wherein, in response to the image file failing to comply with the predetermined profile, the processing unit is further configured to:
- modify the image file to generate a modified image file; and
- upload the modified image file to the social network.

18. The system of claim 13, wherein the processing unit determines compliance of the image file with the predetermined profile by:
- determining that the image file was captured by an authorized user, wherein the determining comprises:
  - identifying a source device that captured contents of the image file;
  - determining a user-identifier associated with the source device;
  - determining a location and time at which the contents of the image file were captured; and
  - determining that the user-identifier is from a list of authorized users from the predetermined profile and that the authorized user associated with the user-identifier was at the location at the time.

19. A computer program product for automatically filtering user images being uploaded to a social network server, the computer program product comprising a computer readable storage medium, the computer readable storage medium comprising computer executable instructions, wherein the computer readable storage medium comprises instructions to:
- receive a predetermined profile associated with a user, the predetermined profile specifying one or more filters for restricting image files containing the user from being uploaded to the social network server;

detect in an image file that is sent for being uploaded to the social network server, an image of the user;

responsively determine compliance of the image file with the predetermined profile that is associated with the user, wherein determining compliance comprises:

identifying a time at which the image file was captured; and determining that the time at which the image file was captured is within a specified range listed in the predetermined profile; and in response to the image failing to comply with the predetermined profile, filter the image file from being uploaded to the social network server.

20. The computer program product of claim 19, wherein, the computer readable storage medium further comprises instructions to:

in response to the image file failing to comply with the predetermined profile:

modify the image file to generate a modified image file; and upload the modified image file to the social network.

* * * * *